United States Patent Office 3,096,624
Patented July 9, 1963

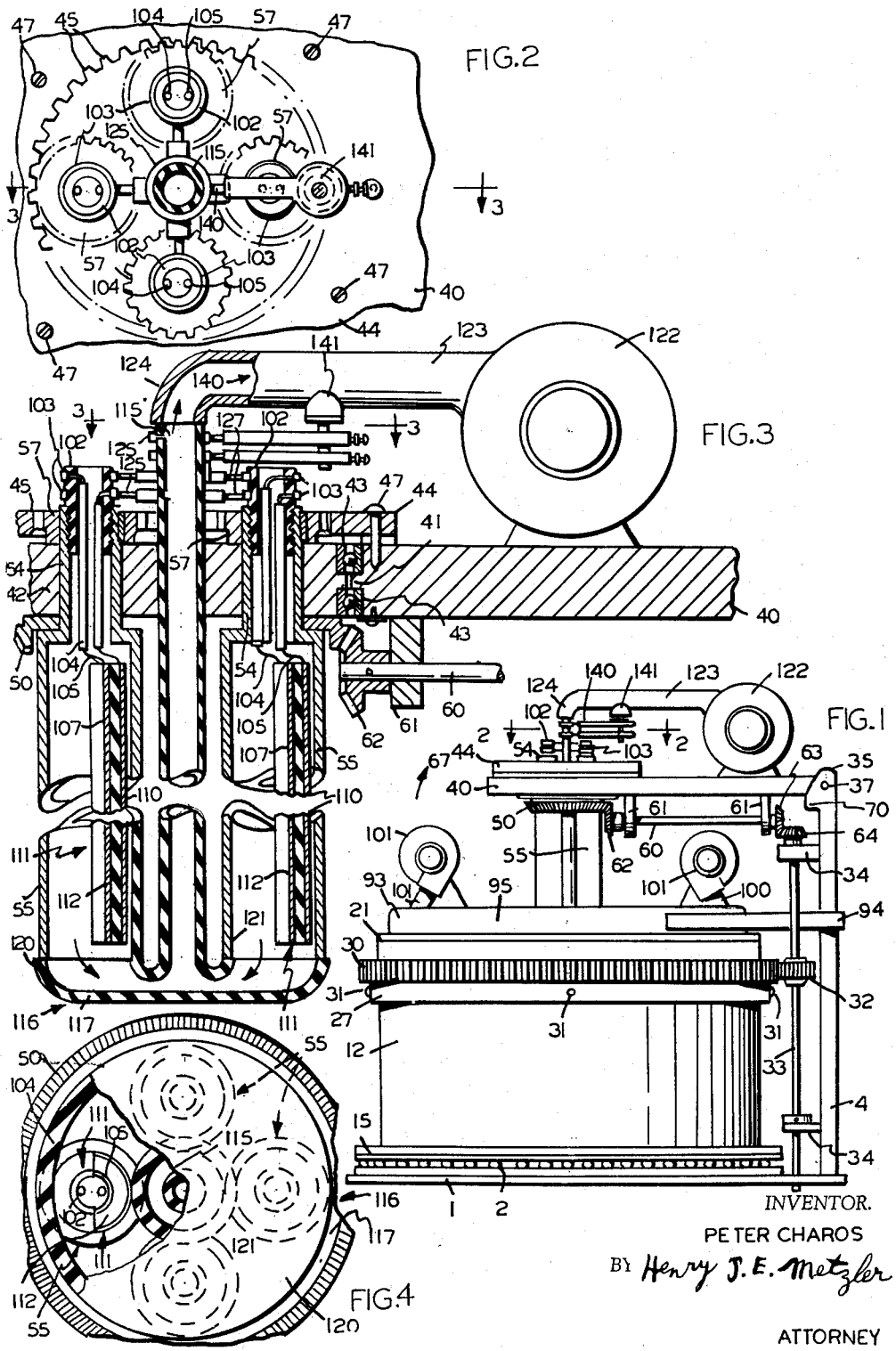

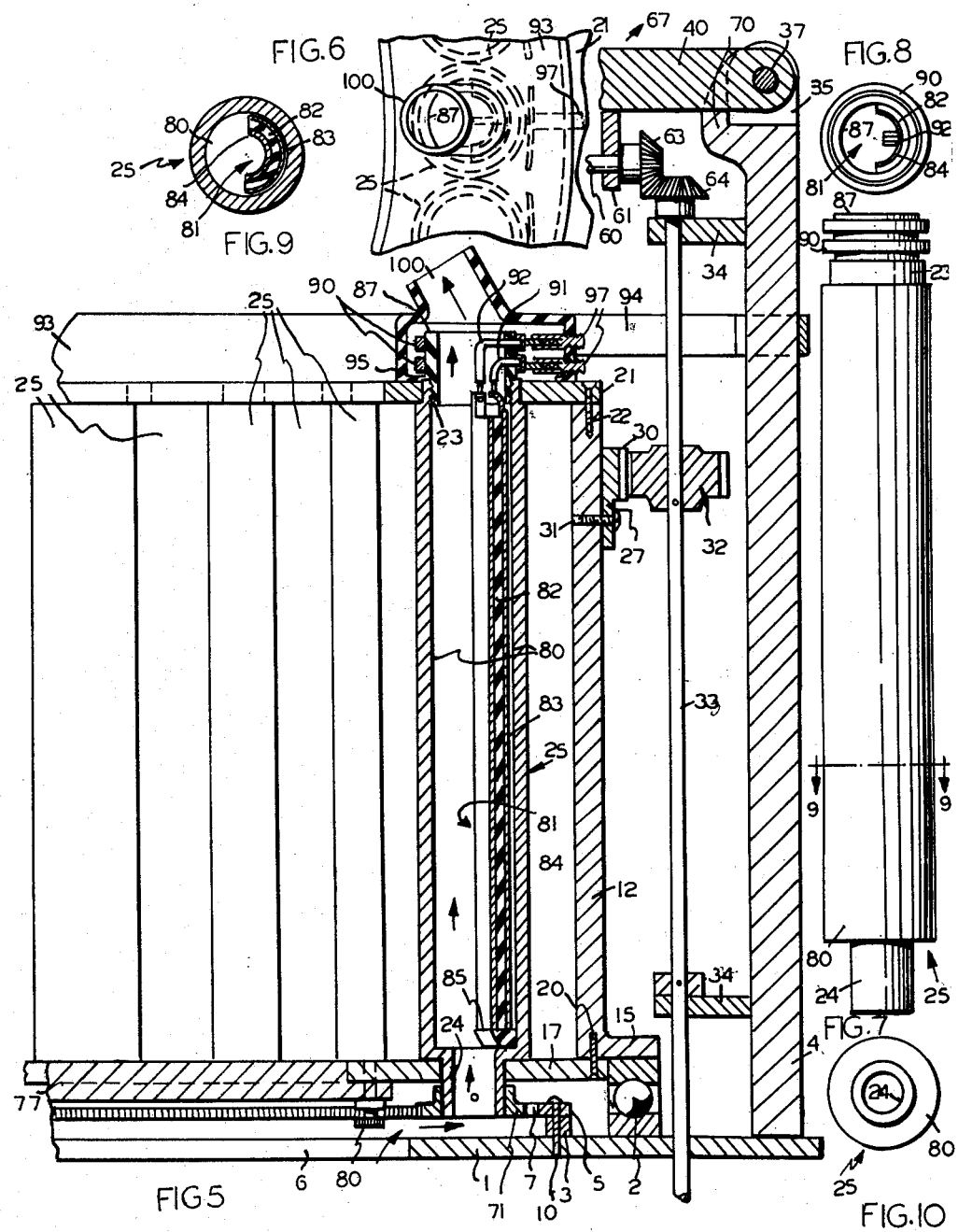

3,096,624
THERMOELECTRIC COOLER ARRANGEMENT
FOR ROLLER MIXER FREEZERS
Peter Charos, Maylen Drive, Hampton Bays, N.Y.
Filed Nov. 22, 1961, Ser. No. 154,293
6 Claims. (Cl. 62—3)

The present invention relates to devices for making ice cream and other frozen products and, more specifically, it relates to an improvement in roller mixer freezers such as are disclosed by my Patent No. 2,987,301.

One object of the present invention is the provision of a roller mixer freezer of the character described which has thermoelectric coolers arranged within its rollers.

Another object of the present invention is the provision of a roller mixer freezer of the character described which has longitudinal slender rollers provided with thermoelectric coolers and with simple and efficient means for removing from said rollers the heat created by heat exchange of said thermoelectric coolers.

A further object of the present invention is the provision of a roller mixer freezer of the character described which is substantially of the same size as the cooler mixer freezers of this type which are not provided with a cooler arrangement, and which has all the advantages of the device disclosed by my Patent No. 2,987,301, in addition to a highly efficient cooling of all rollers and a perfect heat exchange.

With the foregoing and other objects which will appear as the description proceeds, the invention consists of certain novel details of construction and combinations of parts hereinafter more fully described and pointed out in the claims, it being understood that changes may be made in the construction and arrangements of parts of the embodiment disclosed without departing from the spirit of the invention as claimed.

In the accompanying drawing I have set forth an illustrative embodiment of my invention.

In said drawing:

FIG. 1 is a side elevation of a preferred embodiment of my invention;

FIG. 2 is an enlarged fractional sectional view on the line 2—2 of FIG. 1;

FIG. 3 is a fractional sectional view on the line 3—3 of FIG. 2;

FIG. 4 is a fractional detailed bottom plan view of an arrangement of tiltable rollers;

FIG. 5 is an enlarged fractional vertical sectional view through the embodiment shown in FIG. 1;

FIG. 6 is a fractional top plan view of the embodiment shown in FIGS. 1 and 5;

FIG. 7 is a detailed elevational view of the roller;

FIG. 8 is a top plan view of the roller of FIG. 7;

FIG. 9 is a cross-sectional view on the line 9—9 of FIG. 7; and,

FIG. 10 is a bottom plan view of the roller of FIG. 7.

Similar reference characters refer to similar parts throughout the several views.

In the drawings the numeral 1 denotes a base on the top surface of which are mounted a ball bearing member 2, a ring member 3 and a bracket 4. A first annular member 5, which is provided with internal teeth 7, is secured to the member 3 by means of screws 10, which are extended through the member 3 into the base 1. The base 1 is provided with an opening 6 which is surrounded by the elements 2, 3 and 5.

An upright cylindrical member of a receptacle 12 has a lower outwardly extended annular flange portion 15, which rests upon the bearing member 2, and a second annular member 17 is secured to the lower end of the member 12 by means of screws 20 or the like and rests with its outer periphery against the bearing member 2. A third annular member 21 is secured to the top of the member 12 by means of screws 22 or the like.

The annular members 17 and 21 have a circular row of registering holes through which are extended reduced portions 23 and 24 of first upright rollers 25. The first upright rollers 25, which can be made of any suitable material, are rotatable in the cylindrical member 12 in a direction which is opposite to the direction in which the member 12 itself rotates. The rollers 25 preferably are refrigerated in a manner referred to hereinafter.

A fourth annular member 27, which has external teeth 30, is secured to the outer side of the member 12 by means of screws 31 or the like. A toothed pinion 32, which engages the teeth 30 of the member 27, is secured to an upright driving shaft 33, which is rotatably extended through lugs 34 as well as through the base 1. The lugs 34 extend laterally from the bracket member 4 and are secured thereto, or are made as a unit therewith, and any suitable source of power beneath the base 1, such as an electric motor (not shown) turns the shaft 33.

The bracket member 4 has a bifurcated upper portion 35, to which is pivoted at 37 an arm 40 that has a circular opening 41. A disk 42 is rotatable in the opening 41 and is attached to those portions of the arm 40 which surround the opening 41 by means of ball bearings 43 or the like. A fifth annular member 44 which has internal teeth 45, is secured to the upper side of the arm 40 around the opening 41 by means of screws 47 or the like, and a bevel gear wheel 50 is secured to the lower side of the disk 42 by means of screws or the like. Reduced portions 54 of a plurality of upright second rollers 55, which may be the same as the upright rollers 25, are rotatably extended through the disk 42, and a gear wheel 57 is secured to that section of each shaft portion 54 which protrudes beyond the upper side of the disk 42. Thus the second rollers 55 extend into a space encompassed by the first rollers 25 within the cylindrical member 12. The gear wheels 57 engage the teeth 45 of the member 44. A shaft 60 is rotatably extended through lugs 61, which are secured to the lower side of the arm 40, and bevel gear wheels 62 and 63 are secured to the respective ends of the shaft 60 or are made as a unit therewith. Another bevel gear wheel 64 secured to the upper end of the shaft 33, or made as a unit therewith as shown, engages the wheel 63, while the wheel 62 engages the wheel 50.

The arm 40 can be swung on the pivot 37, so that the second rollers 55 can be taken out of the member 12 by swinging the arm 40 in the clockwise direction of the arrow 67 (FIGS. 1 and 5).

When the arm 40 is in the horizontal position shown in FIGS. 1, 2, 3 and 5, a portion of it rests against a stop 70 laterally extended from the bracket member 4, and in this position the wheels 63 and 64 are in engagement with each other.

A toothed pinion 71 is secured to each reduced portion 24 of each first roller 25 and engages the teeth 7 of the member 5. A bottom plate 77 is removably attached to the member 17 by means of knurled set screws 80 or the like.

Upon rotation of the shaft 33, the pinion 32, engaging the teeth 30 of the member 27 causes a rotation of the member 12, and the bevel gear wheel 64, engaging the wheel 63 causes a rotation of the shaft 60. Thereby the pinions 71, which engage the teeth 7 of the stationary member 5, cause the rollers 25 to rotate in a direction which is opposite to the direction of rotation of the member 12, and the gear wheel 62, which engages the bevel gear wheel 50, causes a rotation of the bevel gear 50 as well as of the disk 42, so that the wheels 57, engaging the teeth 45 of the stationary member 44, cause the second rollers 55 to rotate in a direction which is opposite to the direction of rotation of the disk 42 on the wheel 50. When the members 12 and 55 rotate in a clockwise direction, the elements 42 and 50 rotate in a counter-clockwise direction.

I also prefer to provide any suitable stationary scraping members along and between the rollers 25 and 55. Said scraping members may be the same as are shown in my Patent No. 2,987,301.

The finished product can be removed easily and quickly by opening the bottom plate 77 and allowing the contents of the member 12 to drop out of the same and through an opening in the base 1, which opening is approximately of the same size as the bottom plate 77 (FIG. 2). Thereupon a new load of material can be inserted after the arm 40 has been moved into a vertical position.

The above described elements and functions of the same are substantially identical with the elements of the device disclosed by my Patent No. 2,987,301. The important addition of the present improvement is a thermoelectric cooler arrangement for the rollers 25 and/or 55. While in some cases it may be satisfactory to provide only the rollers 25 with said cooling arrangement, I have shown a new construction which cools not only the rollers 25 but also the rollers 55.

Each roller 25 has a hollow main portion 80 as well as the aforementioned end portions 23 and 24. A longitudinal thermoelectric cooler 81 is extended through almost the entire length of the main portion 80 of each roller 25. The cooler 81 preferably is a completely assembled unit which has a foamed-in-place insulation 82 between a hot surface plate 83 and a cold surface plate 84. These cooler units 81 do not form a part of my present invention. They can be purchased in various dimensions and shapes, and I prefer to have them made semi-circular in cross-section, as shown in FIG. 9, so that there will be sufficient space between the hot surface plate 84 and the inner side of the hollow roller 25 for allowing a stream of air to pass through the roller 25 for the purpose of attaining an efficient heat exchange.

Each cooler 81 preferably is supported at its lower end by a semi-circular insulating member 85 (FIG. 5). An insulating bushing member 87 is attached to the upper reduced portion 23 of each roller 25, preferably by screwing it into the inner upper extremity of each roller 25, and a pair of conductive rings 90, which are in spaced relation to one another and to the portion 23 of the member 25, are secured to the outer side of each member 87. Electric conductors 91 and 92 are extended from the rings 90 through the member 87 and are conductively connected to the plates 83 and 84 respectively, so as to connect conductively each of the plates 83 and 84 to a ring 90.

A circular hollow member 93 of insulating material is stationarily mounted, by means of a bracket 94 or the like, on the member 4 or on any other stationary part of the device. The member 93 has an open lower rim portion 95, which is in frictional engagement with the upper side of the annular member 21. Resilient slide contacts 97, which are in frictional and conductive engagement with the rings 90 are extended through, and secured to a wall portion of the member 93. A pair of slide contacts 97 is provided for each cooler 81, and said slide contacts 97 are conductively connected to a source of electrical current (not shown).

The member 93 is provided with tubular portions 100, which are connected to the suction or intake sides of blowers 101 (FIG. 1). Each blower is driven by an electric motor that is connected to a source of electrical current by means of flexible conduits (not shown). Thus when the device is in operation and the rollers 25 are rotating in the manner previously referred to, the coolers 81 are energized, and air is forced through each roller 25. The air enters the device through the opening 6 and passes through the rollers 25, the member 93 into the blowers 101, from whence the warmed air can be forced to any drying equipment (not shown) or the like for being utilized.

In a similar manner the second rollers 55 can be cooled. In this case each roller 55 has a hollow main member portion 102 and a reduced hollow upper portion 54 to which is secured a hollow insulating bushing by means of screwing its lower portion into the upper extremity of the portion 54 of the roller 55. A pair of conductive rings 103, in spaced relation to one another and to the portion 54 of the roller 55, are secured to the outer side of each member 102, and are connected by means of conductors 104 and 105 to the hot plate 107 and to the cold plate 110 of a thermoelectric cooler 111 extended through each roller 55. The thermoelectric coolers 111 also have a foamed-in-place insulation 112 between the plates 107 and 110.

Extended through the center of the disk 42, and firmly secured thereto so that it will rotate therewith, is a tubular portion 115 of an insulating member 116, which has a cup-shaped lower portion 117. Said lower portion 117 has annular rim sections 120 and 121, which are in frictional engagement with the lower extremities of the rollers 25. A blower 122 is mounted on the arm 40 and is driven by an electric motor that is connected to a source of electrical current by a flexible conduit (not shown). To the suction or inlet opening of the blower 122 is secured an air conduit 123, which has a downwardly directed end portion 124 that is in frictional engagement with the upper extremity of the portion 115 of the member 116. A pair of conductive rings 125, in spaced relation to each other and to the portion 124 of the conduit 123, are mounted on the outer side of the upper end section of the portion 115 of the member 116. The rings 125 are conductively connected to resilient slide contacts 127, which are in frictional conductive engagement with the rings 103 on the members 102. Stationary slide contacts 140 are secured, by means of an insulating member 141 to the conduit 123, and are conductively connected to a source of electrical current (not shown). Thus the coolers 111 can be energized while the rollers 55 are rotating as referred to hereinbefore, and a stream of air can be forced through the elements 102, 55, along the hot plates 107, through the member 117 and the conduit 123 into the blower 122, from whence the heated air can pass through a flexible conduit (not shown) to an exhaust or to a device where hot air can be utilized for drying or heating purposes or the like.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. In a roller mixer freezer having a plurality of rotatable rollers mounted in a rotatable vessel, a thermoelectric cooler extended through each roller, a passage for a cooling medium adjacent said cooler being extended through each roller, frictional contact means mounted on each roller being conductively connected to each roller, resilient stationary contacts in frictional engagement with said contact means connecting the same to a source of electrical current, stationary passages connected to the cooling medium passages in said rollers, and means for forcing a cooling medium through each roller and from the same through stationary passages.

2. In a roller mixer freezer having a circular first row of rotatable rollers mounted in a rotatable vessel and a plurality of second rollers rotatably mounted in the space encompassed by said first rollers, thermoelectric coolers of which each has a hot plate and a cold plate extended through each roller, a passage for a cooling medium adjacent the hot plate of said cooler being extended through each roller, frictional contact means provided on each roller being conductively connected to the plates of each cooler, resilient stationary contacts in frictional engagement with said contact means connecting the same to a source of electrical current, stationary passages connected to the cooling medium passages in said rollers, and means for forcing a cooling medium through said rollers and from the same through said stationary passages.

3. A freezing and mixing device comprising a receptacle adapted to be rotated and having side walls, a plurality of first hollow rollers rotatably mounted within said receptacle along its side walls, a plurality of second hollow rollers rotatably mounted in the center of said receptacle, means for rotating said rollers in a direction opposite to the direction of rotation of said receptacle, thermoelectric coolers of which each has a hot plate and a cold plate extended through each roller being arranged therein in such a manner that a space between the hot plate and the inner side of each roller is left free so as to form a passage extending through each roller, frictional contact means provided on each roller being conductively connected to the plates of each cooler, resilient stationary contacts in frictional engagement with said contact means connecting the same to a source of electrical current, stationary passages in frictional engagement with an end of each passage extending through each roller, and means for forcing a cooling medium through said rollers and from the same through said stationary passages.

4. A freezing and mixing device comprising a base, a receptacle being rotatable on said base and having side walls as well as a bottom which has an open portion, means for closing the open portion of said bottom, a first stationary gear member mounted on said base, a plurality of first hollow rollers rotatably mounted within said receptacle along its side walls, a gear wheel connected to each one of said first rollers engaging said first stationary gear member, an arm pivotably mounted above said receptacle being adapted to be moved temporarily away from said receptacle, a disk rotatably mounted on said arm, a plurality of second hollow rollers rotatably mounted on said disk and extending into the center of said receptacle when said arm is above the receptacle, a second stationary gear member mounted on said arm, a gear wheel connected to each one of said second rollers engaging said second stationary gear member, means for rotating said receptacle and said disk, thermoelectric coolers of which each has a hot plate and a cold plate extended through each roller and differing in cross-section from the cross-sectional formation of the interior of the rollers so as to leave between the hot plate and the roller a passage extending lengthwise through each roller, annular contact means provided on each roller being insulated from each other and from the roller and being conductively connected to the plates of each cooler, resilient stationary contacts in frictional engagement with said contact means connecting the same to a source of electrical current, a first air collecting member in frictional connection with said receptacle being adapted for forcing air through the passages extending through said first rollers, a second air collecting member mounted on said disk and rotating therewith and having two end portions a first one of which is in frictional engagement with an end of the passage extending through each one of said second rollers while its second end portion is extended through the center of said disk, first suction means connected to said first air collecting member, and second suction means mounted on said arm and connected to said second air collecting member, said suction means being adapted for forcing air through the passages in said rollers and through said air collecting means.

5. A device of the character described comprising a base provided with an opening, bearing means provided on those portions of said base which surround said opening, an upright cylindrical member having a bottom provided with an opening in registering alignment with the opening in said base and having also a lower flange portion rotatably supported by said bearing means, a closure member removably mounted to portions of said bottom encompassing the opening thereof, an annular member provided with internal teeth being mounted on said base intermediate its opening and said bearing means, a plurality of hollow upright first rollers rotatably mounted on the inner side of said cylindrical member, pinions mounted on the lower ends of said first rollers engaging the teeth of said annular member, a plurality of upright second hollow rollers extended into a space between said first rollers within said cylindrical member, means for swinging said second rollers as a unit out of and into said cylindrical member, means for rotating said cylindrical member and said second rollers as a unit in a predetermined direction thereby causing said first rollers, through the engaging of said pinions with said annular member, to rotate in a direction which is opposite to the direction of rotation of said second rollers, thermoelectric coolers of which each has a hot plate and a cold plate extended through each roller and differing in cross-section from the cross-sectional formation of the interior of the rollers so as to leave between the hot plate and the roller a passage extending lengthwise through each roller, annular contact means provided on each roller being insulated from each other and from the roller and being conductively connected to the plates of each cooler, resilient stationary contacts in frictional engagement with said contact means connecting the same to a source of electrical current, stationary passages in frictional engagement with an end of each passage extending through each roller, and means for forcing a cooling medium through said rollers and from the same through said stationary passages.

6. A freezing and mixing device comprising a base, a receptacle having side walls as well as a bottom which has an open portion and also having a lower flange portion, bearing means on said base rotatably supporting thereon the flange portion of said receptacle, removable means for closing the open portion of said bottom, a first stationary gear member mounted on said base, a plurality of first hollow rollers rotatably mounted within said receptacle along its side walls, a gear wheel connected to each one of said first rollers engaging said first stationary gear member, a horizontal arm pivotally mounted above said receptacle being adapted to be moved temporarily into a vertical position, a disk rotatably mounted on said arm, a plurality of second hollow rollers rotatably mounted on said disk and extending into the center of said receptacle when said arm is in a horizontal position, a second stationary gear member mounted on said arm, a gear wheel connected to each one of said second rollers engaging said second stationary gear member, means for rotating said receptacle and said disk, thermoelectric coolers of which each has a hot plate and a cold plate extended through each roller and being semi-circular in cross-section and arranged within the rollers in such a manner each hot plate adjacent a first longitudinal portion of the inner side of a roller whereas a passage extending through the roller is left unobstructed between the hot plate and a second longitudinal portion of the inner side of each roller, annular contact means provided on each roller being insulated from each other and from the roller and being conductively connected to the plates of each cooler, resilient stationary contacts in frictional engagement with said contact means connecting the same to a source of electrical current, a first air collecting member in frictional connection with said receptacle being adapted for forcing air through the passages extending through said first rollers, a second air collecting member mounted on said disk and rotating therewith and having two end portions a first one of which is in frictional engagement with an end of the passage extending through each one of said second rollers while its second end portion is extended through the center of said disk, first suction means connected to said first air collecting member, and second suction means mounted on said arm and connected to said second air collecting member, said suction means being adapted for forcing air through the passages in said rollers and through said air collecting means.

References Cited in the file of this patent
UNITED STATES PATENTS

| | | |
|---|---|---|
| 2,949,014 | Belton | Aug. 16, 1960 |
| 2,987,301 | Charos | June 6, 1961 |